May 13, 1941.  R. C. JOHNSEN ET AL  2,242,033

METAL CUTTING TOOL

Filed July 16, 1940

INVENTORS:
Richard C. Johnsen and
Harold C. Smith,
BY Harry R. Cook,
ATTORNEY

Patented May 13, 1941

2,242,033

UNITED STATES PATENT OFFICE 2,242,033

METAL CUTTING TOOL

Richard Charles Johnsen and Harold C. Smith, West Orange, N. J.

Application July 16, 1940, Serial No. 345,724

5 Claims. (Cl. 29—96)

This invention relates generally to lathe tools and particularly to cutting-off tools, thread cutting tools and the like.

During use of lathe tools, particularly in cutting-off and thread cutting work, there is frequently a tendency for the tool to chatter or gouge the work, especially when the tool encounters excessive resistance to cutting as when the tool is advanced too rapidly into the work or is set for an excessively deep cut, and one object of the present invention is to provide a novel and improved tool of the general character described wherein the cutter or bit shall be capable of yielding linearly from the work in the plane of advance of the cutter to the work, and at the same time lateral movement of the bit or cutter in planes at angles and planes parallel to the axis of the work, shall be prevented.

A further object is to provide a tool of this character wherein the tool shall comprise a shank having a bit or cutter holder connected integrally to the shank by a resilient goose neck to permit linear yielding of the cutter away from the work, and novel and improved means shall be provided for preventing lateral movement of the cutter holder in planes at angles to the axis of the work and in planes parallel to the work axis.

Other objects of the invention are to provide such a tool that shall embody a novel and improved goose neck connection between the shank of the tool and the cutter holder, and to obtain other advantages and results of the invention as will appear from the following description in conjunction with the accompanying drawing in which—

Figure 1:
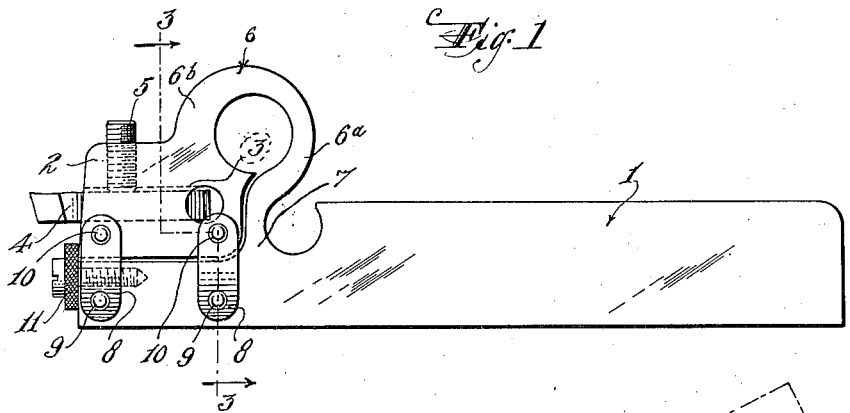
Figure 1 is a side elevational view of a metal cutting tool embodying my invention.
Figure 2:
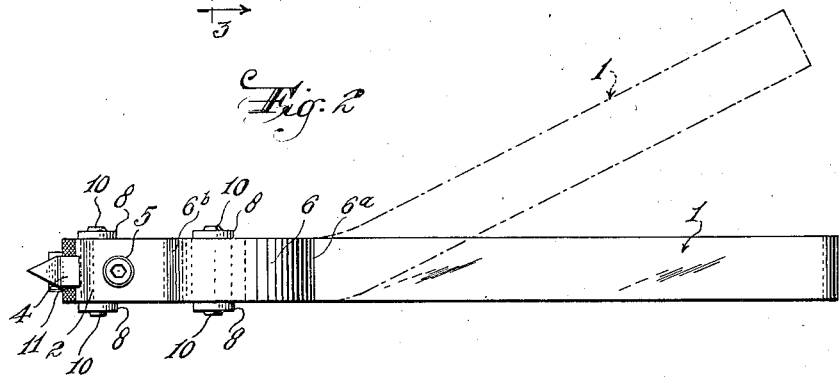
Figure 2 is a top plan view thereof.
Figure 3:
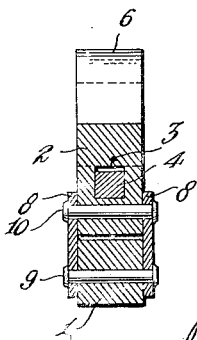
Figure 3 is a transverse vertical sectional view on the line 3—3 of Figure 1.

Specifically describing the invention, the tool comprises a shank 1 in the general form of a rectangular bar which may be straight as shown by solid lines in Figures 1 and 2 or may be angular as indicated by dot and dash lines in Figure 2.

At one end of the shank is a cutter or bit holder 2 which is integrally connected to the shank by a "goose neck" spring 6 that is shown as comprising a split circular loop having the cutter holder at one end and having an extension at the other end connected to the shank at 7. The cutter holder has a recess 3 extending inwardly from the free end thereof for receiving the cutter or bit 4 that may be secured in the recess in the usual way as by a set screw 5. The goose neck 6 includes an arm 6a integrally connected at 7 to the shank and an arm 6b returned in juxtaposition to the arm 6a and carrying the cutter holder 2 at its free end. The recess 3 for the cutter is disposed in the cutter holder intermediate the length of the arm 6a or above the point of connection 7 of the arm 6a with the shank; in other words, all portions of the goose neck and cutter holder are located at one side of the point of connection 7 of the goose neck to the shank.

With this construction, when the tool is mounted in a tool post of a lathe, or otherwise as desired, should the cutter 4 encounter excessive resistance in the cutting operation, it may yield linearly away from the work in a plane approximately parallel to the direction in which the cutter has been advanced toward the work, the arms of the goose neck yielding substantially uniformly so as to permit practically exact linear movement of the cutter with a minimum of tendency to swing the cutter in planes at angles to the axis of the work. It will be observed that were the cutter mounted inwardly of or below the point of connection 7 of the goose neck to the shank, the yielding of the goose neck would tend to tilt the cutter downwardly or in the plane of the shank.

To further limit such movement of the cutter in the plane of the shank or vertically or in planes at angles to the axis of the work, we provide two pairs of parallel links 8, the links of each pair being disposed at opposite sides of the shank with one end pivotally connected to the shank by a pin 9 and the other end pivotally connected to the cutter holder by a pin 10. The two links at each side of the shank are related to each other and to the cutter holder 2 so that the cutter holder is constrained to move substantially exactly linearly and is held against tilting in planes at angles to the axis of the work.

At the same time, the links 8 ensure a minimum of resistance to free and uniform linear movement of the cutter holder as compared, for example, with the frictional resistance that is present in some heretofore known tools of this general character wherein the cutter holder is slidably mounted on a guide.

The links also restrain the cutter holder against movement laterally of the shank or in directions transverse to the plane of movement of the cutter toward and from the work. The structure therefore insures against the cutter becoming jammed under and gouging the work.

In some instances it may be desirable to provide means for limiting "snap action" on the return of the cutter to the work after yielding thereof from the work for any reason. For this purpose we may utilize a set screw 11 threaded in the end of the shank having a flange to be abutted by the forward end of the cutter holder 2.

While we have shown and described the invention as embodied in certain details of structure, it should be understood that this is primarily for the purpose of illustrating the now preferred embodiment of the principles of the invention and that many modifications and changes may be made in the details of construction of the tool without departing from the spirit or scope of the invention.

Having thus described our invention, what we claim is:

1. A metal cutting tool including a shank having a goose neck spring comprising two juxtaposed arms, one end of one of which is connected to said shank while the free end of the other arm carries a cutter holder to permit yielding linear movement of the cutter holder under working thrust on the cutter, and parallel links each having one end pivotally connected to said shank and the other end pivotally connected to said cutter holder.

2. A metal cutting tool including a shank having a goose neck spring comprising two juxtaposed arms, one end of one of which is connected to said shank while the free end of the other arm carries a cutter holder to permit yielding linear movement of the cutter holder under working thrust on the cutter, and two pairs of parallel links, the links of each pair being disposed at opposite sides of said shank and each link being pivotally connected respectively to the shank and the cutter holder.

3. A metal cutting tool including a shank having a goose neck spring comprising two juxtaposed arms, one end of one of which is connected to said shank while the free end of the other arm carries a cutter holder to permit yielding linear movement of the cutter holder under working thrust on the cutter, and two pairs of parallel links, the links of each pair being disposed at opposite sides of said shank, and two pivot pins for each pair of links passing through said links and the shank and the cutter holder respectively.

4. The metal cutting tool set forth in claim 2 wherein said pairs of links are spaced in the direction of said linear movement of said cutter holder.

5. A metal cutting tool comprising a shank, a cutter holder and a yielding connection between them to permit linear movement of said cutter holder relative to said shank under working thrust on the cutter, parallel links each having one end pivotally connected to said shank and the other end pivotally connected to said cutter holder, said links being spaced from each other in the direction of said linear movement of the cutter.

RICHARD CHARLES JOHNSEN.
HAROLD C. SMITH.